(12) United States Patent
Apparao et al.

(10) Patent No.: US 10,635,337 B2
(45) Date of Patent: Apr. 28, 2020

(54) DYNAMIC CONFIGURATION OF COMPRESSED VIRTUAL MEMORY

(71) Applicant: Intel Corporation, Santa Clara, CA (US)

(72) Inventors: Padmashree K. Apparao, Portland, OR (US); Zhen Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/300,143

(22) PCT Filed: Jun. 27, 2016

(86) PCT No.: PCT/CN2016/087267
§ 371 (c)(1),
(2) Date: Nov. 9, 2018

(87) PCT Pub. No.: WO2018/000128
PCT Pub. Date: Jan. 4, 2018

(65) Prior Publication Data
US 2019/0146699 A1    May 16, 2019

(51) Int. Cl.
*G06F 12/00* (2006.01)
*G06F 13/00* (2006.01)
(Continued)

(52) U.S. Cl.
CPC .......... *G06F 3/0631* (2013.01); *G06F 3/0608* (2013.01); *G06F 3/0653* (2013.01); *G06F 3/0661* (2013.01); *G06F 3/0664* (2013.01); *G06F 3/0673* (2013.01); *G06F 11/3037* (2013.01); *G06F 11/34* (2013.01); *G06F 11/3409* (2013.01); *G06F 12/08* (2013.01); *G06F 2201/81* (2013.01);
(Continued)

(58) Field of Classification Search
CPC ...................................................... G06F 12/08
See application file for complete search history.

(56) References Cited

U.S. PATENT DOCUMENTS

| | | |
|---|---|---|
| 5,696,926 A | 12/1997 | Culbert et al. |
| 6,728,907 B1 * | 4/2004 | Wang ............... G06F 11/073 714/2 |

(Continued)

FOREIGN PATENT DOCUMENTS

| | | |
|---|---|---|
| CN | 104503740 A | 4/2015 |
| CN | 104737137 A | 6/2015 |
| CN | 105512050 A | 4/2016 |

OTHER PUBLICATIONS

International Search Report and Written Opinion for International Patent Application No. PCT/CN2016/087267, dated Apr. 12, 2017, 11 pages.

(Continued)

Primary Examiner — Sean D Rossiter
(74) Attorney, Agent, or Firm — Jordan IP Law, LLC

(57) ABSTRACT

Systems, apparatuses and methods may provide for compressed virtual memory (CVM) management using CVM arbitration. CVM arbitration may monitor CVM utilization, tune CVM and update CVM settings that may be enabled upon reboot of a system and/or apparatus. The CVM arbitration may improve memory management, thereby improving system performance and user experience.

25 Claims, 8 Drawing Sheets

(51) Int. Cl.
*G06F 3/06* (2006.01)
*G06F 11/34* (2006.01)
*G06F 12/08* (2016.01)
*G06F 11/30* (2006.01)

(52) U.S. Cl.
CPC ............... *G06F 2212/1016* (2013.01); *G06F 2212/1044* (2013.01); *G06F 2212/401* (2013.01); *G06F 2212/601* (2013.01)

(56) References Cited

U.S. PATENT DOCUMENTS

| | | | |
|---|---|---|---|
| 10,248,321 B1 * | 4/2019 | Karppanen | G06F 9/4818 |
| 2006/0218367 A1 * | 9/2006 | Ukai | G06F 3/061 711/165 |
| 2012/0324481 A1 | 12/2012 | Xia et al. | |
| 2014/0082341 A1 * | 3/2014 | Lin | G06F 9/4418 713/2 |
| 2014/0189281 A1 | 7/2014 | Sokol, Jr. | |
| 2015/0242432 A1 | 8/2015 | Bak et al. | |
| 2015/0347181 A1 | 12/2015 | Myrick et al. | |
| 2017/0285977 A1 * | 10/2017 | Zhou | G06F 3/0634 |
| 2018/0349261 A1 * | 12/2018 | Desai | G06F 12/023 |

OTHER PUBLICATIONS

Extended European Search Report for European Patent Application No. 16906532.3, dated Jan. 27, 2020, 10 pages.

\* cited by examiner

400

| Model | Tablet EFG | | |
|---|---|---|---|
| | ZRAM Enabled | ZRAM Disabled | |
| Application Name | Launch Time (sec) | | Delta % |
| XYZ Launcher under high memory pressure | 3.1 | 2.2 | 140% |
| BlaBla Chat under high memory pressure | 44.9 | 31.9 | 141% |
| ABC Surfer under high memory pressure | 36.8 | 31.2 | 118% |

FIG. 4

| Tablet EFG | | | | | |
|---|---|---|---|---|---|
| Process | ZRAM Enabled | | ZRAM Disabled | | |
| | % of INST | % of CPU Clocks | % of INST | % of CPU Clocks | |
| kswapd0 | 44.9% | 33.7% | 16.0% | 9.1% | |
| vmm-vmm | 8.1% | 16.3% | 8.7% | 15.8% | |
| Pid 0x0 | 5.4% | 11.8% | 9.9% | 21.9% | |
| app_process32 | 13.6% | 9.5% | 27.2% | 14.2% | |
| surfaceflinger | 2.1% | 3.9% | 6.4% | 11.1% | |

FIG. 5

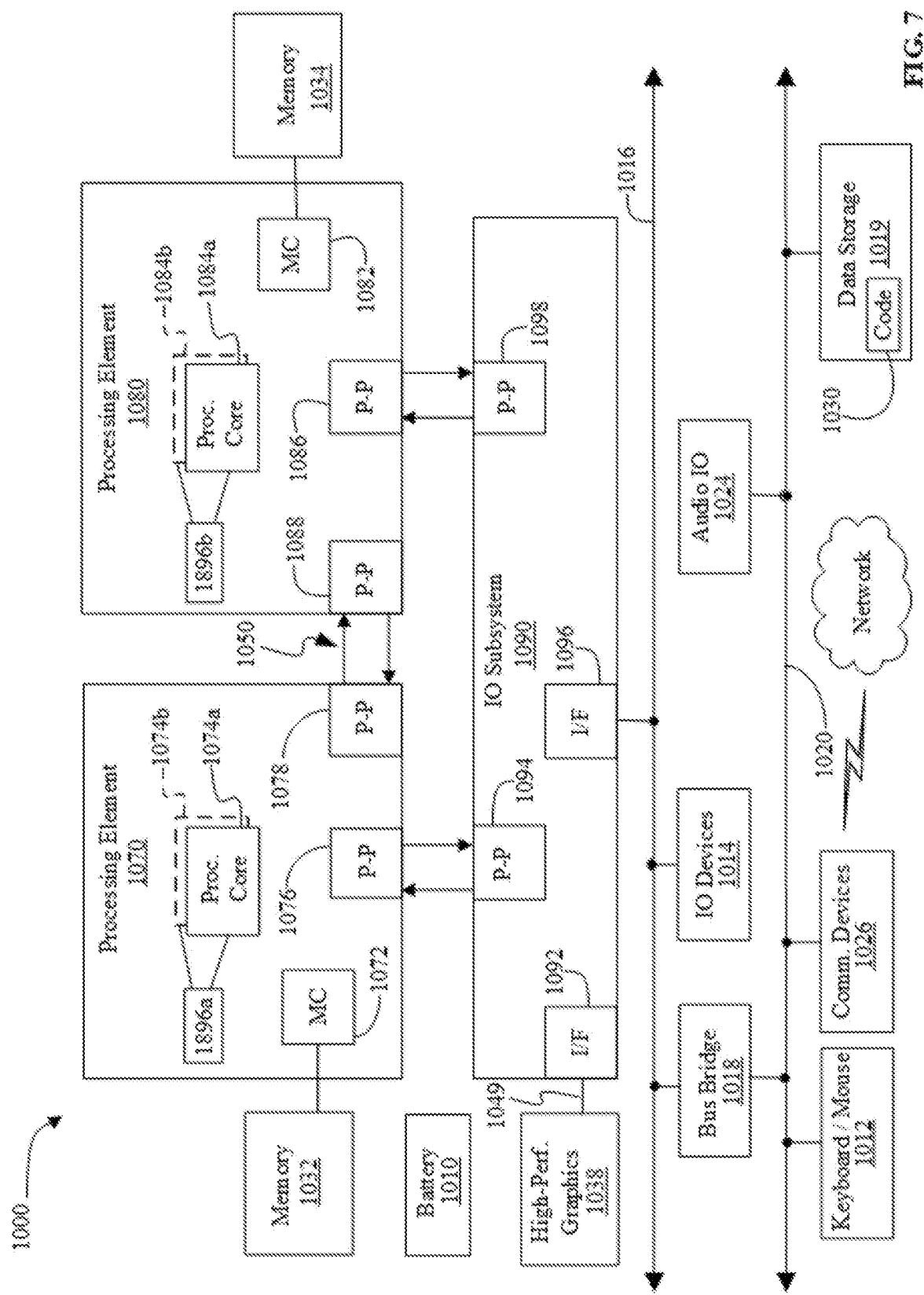

_US 10,635,337 B2_

DYNAMIC CONFIGURATION OF COMPRESSED VIRTUAL MEMORY

CROSS REFERENCE TO RELATED APPLICATIONS

This application is a U.S. National Phase Patent Application which claims benefit to International Patent Application No. PCT/US2016/087267 filed on Jun. 27, 2016.

TECHNICAL FIELD

Embodiments generally relate to compressed virtual memory (CVM) management in computing systems. More particularly, embodiments relate to monitoring CVM utilization, tuning CVM and updating CVM settings that may be enabled upon reboot of a system and/or apparatus in order to improve memory management, system performance and user experience.

BACKGROUND

Computing systems such as mobile devices, notebook computers and tablet computers running operating systems such as, for example, an ANDROID (Open Handset Alliance), IOS (APPLE, Inc.), LINUX (Linux Foundation), or WINDOWS (MICROSOFT Corp.) operating system may use fixed (e.g., vendor/factory set) CVM settings size. For example, a typical mobile device might have a CVM settings size that is fixed at 200 MB, 300 MB or 400 MB, with a swappiness (e.g., LINUX kernel parameter) from 60 to 100 that may control the degree to which the system swaps memory pages to/from memory and/or CVM to/from a swap space on a secondary memory storage such as flash memory, hard drive. In conventional systems, the overhead (e.g., resource utilization) of moving data into and out of CVM may increase when the amount of available system memory is relatively low, even though there may be sufficient work being done by the system in the background to maintain free memory by stopping (e.g., "killing") processes and services. Indeed, while running applications with heavy resource usage (e.g., central processing unit/CPU and/or memory) in foreground memory, a system may appear to almost crawl to a halt while attempting to free up memory. Moreover, having CVM activities run in the background may further degrade system performance, because one or more applications destined to be stopped that happen to reside in CVM may need to be uncompressed prior to being stopped, while other applications may need to be compressed and then pushed into CVM to free up memory for foreground applications.

BRIEF DESCRIPTION OF THE DRAWINGS

The various advantages of the embodiments will become apparent to one skilled in the art by reading the following specification and appended claims, and by referencing the following drawings, in which:

FIG. 4 is an illustration of an example of a chart of data documenting the impact of CVM on the launch time of applications according to an embodiment;

FIG. 5 is an illustration of an example of a chart of data documenting the impact of CVM on processes running in memory according to an embodiment;

FIG. 7 is a block diagram of an example of a computing system according to an embodiment.

DESCRIPTION OF EMBODIMENTS

Figure 1A:
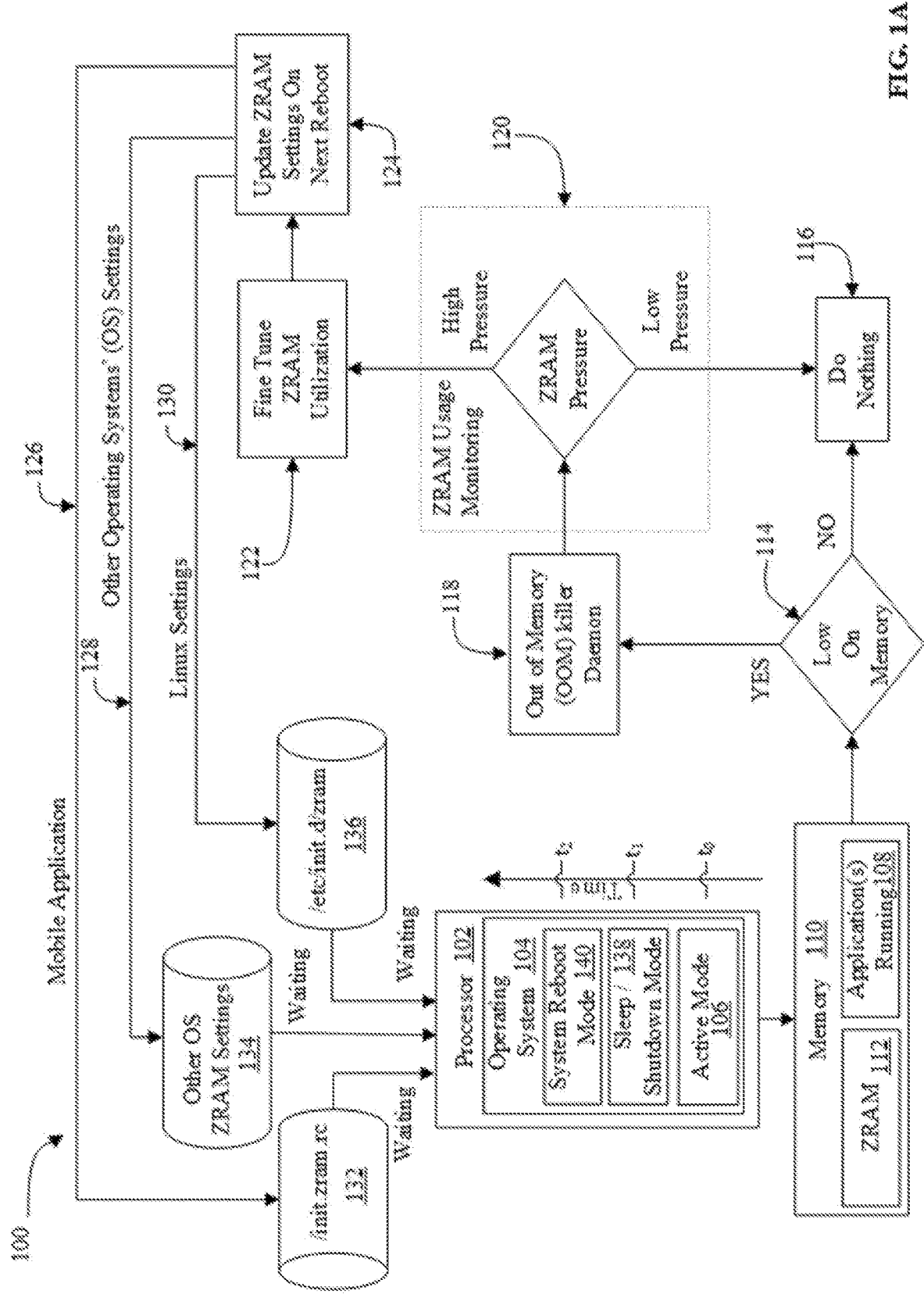
FIGS. 1A and 1B are block diagrams of an example of dynamic configuration systems according to embodiments.

Turning now to FIG. 1A, a block diagram of a dynamic configuration system 100 that includes a processor 102 (e.g., CPU, input/output module, chipset) is shown, wherein the processor 102 runs an operating system (OS) 104 such as, for example, an ANDROID (Open Handset Alliance), IOS (APPLE, Inc.), LINUX (Linux Foundation), or WINDOWS (MICROSOFT Corp.) operating system. The processor 102 may be incorporated into a wide variety of computing systems such as, for example, a server, workstation, desktop computer, notebook computer, tablet computer, convertible tablet, smart phone, personal digital assistant (PDA), mobile Internet device (MID), media player, wearable computer, and so forth.

In the illustrated example, at time $t_0$ the OS 104 may be in active mode 106 during which one or more application(s) 108 run in the foreground or background of memory 110. The OS 104 may consider an application in foreground memory to be actively used and thus not a candidate for killing (e.g., stopping) when available memory is relatively low. The OS 104 may consider an application in background memory to be inactively used so that if memory space needs to be reclaimed (e.g., freed) the OS 104 may kill (e.g., stop) the application in background memory to preserve and/or improve performance, interactivity and/or user experience (UX) during, for example, the display of a large page in a web browser.

The memory 110 may be coupled to the processor 102 by, for example, a memory bus. In addition, the memory 110 may be implemented as main memory. The memory 110 may include, for example, volatile memory, non-volatile memory, and so on, or combinations thereof. For example, the memory 110 may include dynamic random access memory (DRAM) configured as one or more memory modules such as, for example, dual inline memory modules (DIMMs), small outline DIMMs (SODIMMs), etc., read-only memory (ROM) (e.g., programmable read-only memory (PROM), erasable PROM (EPROM), electrically EPROM (EEPROM), etc.), phase change memory (PCM), and so on, or combinations thereof. The memory 110 may include an array of memory cells arranged in rows and columns, partitioned into independently addressable storage locations.

The memory 110 may also include a compressed virtual memory (CVM) (e.g., also referred to as "ZRAM") 112 (e.g., an OS kernel feature) that may be provided by the OS 104. The ZRAM 112 may be configured with one or more settings that impact the launch time (e.g., time at which an application becomes active in foreground memory), performance and interactivity of the applications 108. The ZRAM 112 may increase performance by avoiding memory paging to a swap space on a secondary memory storage (e.g., flash memory, hard drive), and instead the operating system 104 may perform memory paging in/to the ZRAM 112 until the OS 104 and/or the ZRAM 112 decides to use the secondary memory storage. The ZRAM 112 may operate like a virtual cache for the processes being executed by the processor 102 and/or running in the memory 110. The illustrated ZRAM 112 may create memory based block devices (e.g., ZRAM block devices) to store compressed memory pages (e.g., memory blocks). The ZRAM block devices may allow very fast I/O (input/output) and ZRAM 112 compression approximately a third of original size) may provide a much larger portion of memory for use by the system 100. The ZRAM 112 may use compression and decompression algorithms that may run on/in one or more CPU cores (not shown) of the processor 102 while consuming CPU cycles. When a ZRAM 112 compressed memory page is retrieved, decompression may be performed to access the associated address and use the memory page.

A memory monitor 114 may generally track/monitor the memory utilization and/or the ZRAM 112 utilization, and when the memory utilization and/or the ZRAM utilization is relatively low, the operating system 104 may take no action at block 116. When the memory utilization and/or the ZRAM utilization is not relatively low (e.g., an OS-determined minimum threshold of available memory is exceeded), the operating system 104 may trigger (e.g., execute) an out of memory (OOM) killer daemon 118 to free (e.g., kill and/or stop one or more applications running in background memory) a certain amount of memory to a free memory threshold to improve execution performance for the one or more applications 108 running in foreground memory (e.g., actively being used). Aggressive activity by the OOM killer daemon 118 (e.g., frequent execution to kill applications) may indicate that assistance in freeing memory may be needed. When the OOM killer daemon 118 is triggered (e.g., executed), a ZRAM usage monitor 120 may make a determination as to whether the ZRAM utilization is relatively low (e.g., low pressure) or relatively high (e.g., high pressure), based on conducting a comparison between the ZRAM utilization and a ZRAM utilization threshold (e.g., dynamically tuned). When the ZRAM usage monitor 120 determines that ZRAM utilization is low, the operating system 104 may take no action 116, as already noted.

When the ZRAM utilization is relatively high, however, the ZRAM utilization may be tuned at block 122 and one or more ZRAM settings (e.g., the ZRAM size and/or swappiness) may be updated (e.g., enabled/adjusted/changed) at block 124 upon the next reboot of the system 100 and/or waking the system 100 from a sleep mode. The illustrated OS 104 stores the updated ZRAM settings, depending on one or more operating system communication paths 126, 128 and 130, to one or more storage locations 132, 134 and 136, respectively.

In the illustrated example, at time $t_1$ the OS 104 may transition the system 100 to a sleep or shutdown mode 138 to await using the updated ZRAM settings at a time t, when the OS 104 may transition the system 100 to a system reboot mode 140, during which the ZRAM is updated to operate using the updated ZRAM settings stored in the one or more storage locations 132, 134 and 136.

Figure 1B:
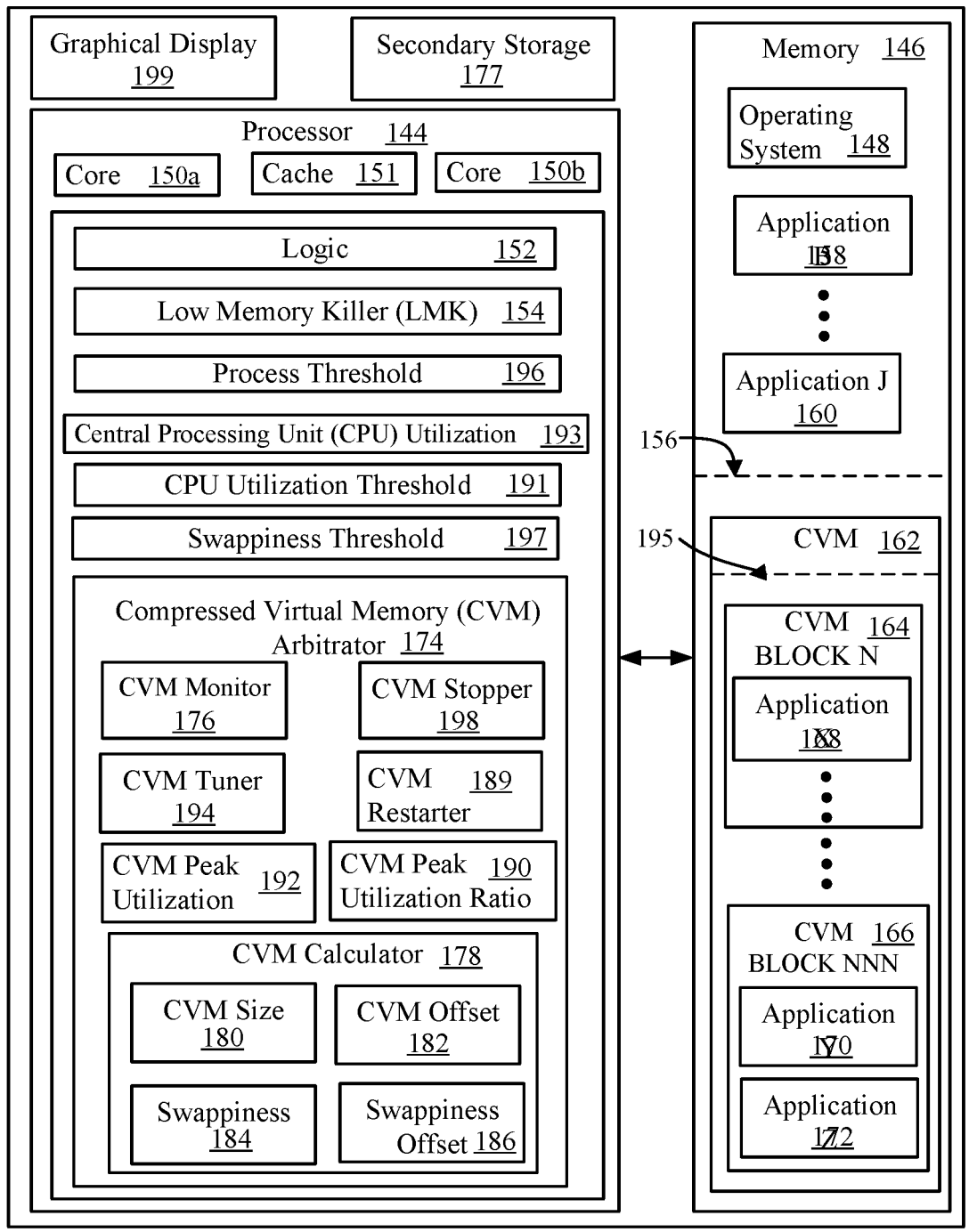

In another example, FIG. 1B illustrates a block diagram of a dynamic configuration system 142 according to an embodiment. The dynamic configuration system 142, which may be readily substituted for the system 100 (FIG. 1A), already discussed, may include a processor 144, a communications interface (not shown) and memory 146 coupled to the processor 144. The processor 144 runs an operating system (OS) 148. The memory 146 may be coupled to the processor 144 by, for example, a memory bus. In addition, the memory 146 may be implemented as main memory. The memory 146 may include, for example, volatile memory, non-volatile memory, and so on, or combinations thereof. For example, the memory 146 may include DRAM configured as one or more memory modules such as, for example, DIMMs, SODIMMs, etc., ROM (e.g., PROM, EPROM, EEPROM, etc.), PCM, and so on, or combinations thereof. The memory 146 may include an array of memory cells arranged in rows and columns, partitioned into independently addressable storage locations.

The dynamic configuration system 142 may include cores 150a, 150b that may execute one or more instructions such as a read instruction, a write instruction, an erase instruction, a move instruction, an arithmetic instruction, a control instruction, and so on, or combinations thereof. The cores 150a, 150b may, for example, execute one or more instructions to move data (e.g., program data, operation code, operand, etc.) between a cache 151 or a register (not shown) and the memory 146, to read the data from the memory 146, to write the data to the memory 146, to perform an arithmetic operation using the data (e.g., add, subtract, bitwise operation, compare, etc.), to perform a control operation associated with the data (e.g., branch, etc.), and so on, or combinations thereof. The instructions may include any code representation such as, for example, binary code, octal code, and/or hexadecimal code (e.g., machine language), symbolic code (e.g., assembly language), decimal code, alphanumeric code, higher-level programming language code, and so on, or combinations thereof. Thus, for example, hexadecimal code may be used to represent an operation code (e.g., opcode) of an x86 instruction set including a byte value "00" for an add operation, a byte value "8B" for a move operation, a byte value "FF" for an increment/decrement operation, and so on.

The dynamic configuration system 142 may include logic 152 to coordinate processing among the various components and/or subsystems of the dynamic configuration system 142. The operating system 148 may trigger (e.g., execute) a low memory killer (LMK) 154 (e.g., out of memory (OOM) killer daemon) to free (e.g., kill and/or stop one or more applications running in background memory) a certain amount of memory to a free memory threshold 156 to improve execution performance for the one or more applications 158, 160 running in foreground memory. The memory 146 may include a compressed virtual memory (CVM) 162 (e.g., also referred to as "ZRAM") that may create one or more CVM blocks 164, 166 (e.g., CVM block devices) to store compressed memory pages (e.g., memory blocks) where one or more applications 168, 170, 172 may be stored (e.g., running in background memory). The CVM blocks 164, 166 may allow very fast I/O (input/output) and CVM 162 compression (e.g., approximately a third of original size) may provide a much larger portion of memory for use by the system 142. The CVM 162 may use compression and decompression algorithms that may run on/in one or more of the CPU cores 150a, 150b of the processor 144 while consuming CPU cycles.

The dynamic configuration system 142 may include a CVM arbitrator 174 that includes a CVM monitor 176 (e.g., CVM usage monitor) to monitor CVM usage and/or memory utilization. The operating system 148 may perform memory paging in/to the CVM 162 until the OS 148 and/or the CVM arbitrator 174 decides to use secondary memory storage 177.

The CVM arbitrator 174 may include a CVM calculator 178 that calculates the CVM size 180, a CVM size offset 182 (e.g., offset), swappiness 184 and a swappiness offset 186 for the memory 146 and/or CVM 162. The CVM size offset 182 may be used to tune the size of the CVM 162. The swappiness offset 186 may be used to tune the swappiness 184, for example, to a value between 0 and 100.

The CVM monitor 176 may monitor the low memory killer 154 and determine when/whether the low memory killer 154 is executed. If an out of memory (OOM) or low memory condition is detected, the CVM monitor 176 may monitor a CVM peak utilization ratio 190 that may be calculated by the CVM calculator 178 as the ratio of the CVM size 180 and CVM peak utilization 192 (e.g., largest amount of space of CVM 162 used). The CVM arbitrator 174 may include a CVM tuner 194 that may conduct a comparison between the CVM peak utilization ratio 190 and a CVM peak utilization threshold 195 and determine whether the peak utilization ratio 190 exceeds the CVM peak utilization threshold 195 (e.g., approximately 80% of the CVM size 180) based on the comparison between the CVM peak utilization ratio 190 and a CVM peak utilization threshold 195. If so, the CVM tuner 194 may increase the CVM size offset 182 to an increased CVM size offset, when the CVM peak utilization ratio 190 exceeds the CVM peak utilization threshold 195. The dynamic configuration system 142 may continue to operate with current CVM settings, waiting for the system 142 to reboot when the CVM settings may be updated/enabled, including setting the CVM size 180 to the increased CVM size offset.

If CVM tuner 194 determines that the CVM peak utilization threshold 195 is not exceeded, the CVM tuner 194 may determine whether the CVM peak utilization ratio 190 is less than the CVM peak utilization threshold 195 (e.g., approximately 50% of the CVM size 180) based on the comparison between the CVM peak utilization ratio 190 and the CVM peak utilization threshold 195. If so, the CVM tuner 194 may conduct a comparison between a number of applications running (e.g., launched) 158, 160, 168, 170, 172 (e.g., in the memory 146 and/or the CVM 162) and a process threshold 196 (e.g., am_process limit) and determine whether the number of applications running 158, 160, 168, 170, 172 is less than the process threshold 196 based on the comparison between the number of applications miming and the process threshold 196. The system 142 may ensure that the number of applications running does not exceed the process threshold 196. If the number of running applications is less than the process threshold 196, the CVM tuner 194 may decrease the CVM size offset 182 to a decreased CVM size offset, based on the comparison between the number of applications running and the process threshold 196 (e.g., am_process limit). The process threshold 196 may be set by the OS 148 based on the size of the memory 146 and/or the configuration of the system 142.

If the number of running applications is less than the process threshold 196, the CVM tuner 194 may conduct a comparison between the swappiness 184 and a swappiness threshold 197 and determine whether the swappiness 184 is less than the swappiness threshold 197 based on the comparison between the swappiness 184 and the swappiness threshold 197. If so, the CVM tuner 194 may increase the swappiness offset 186 for the swappiness 184 to an increased swappiness offset. The dynamic configuration system 142 may continue to operate with current CVM settings, waiting for the system to reboot when the CVM settings may be updated/enabled, including setting the CVM size 180 to the decreased CVM size offset and setting the swappiness 184 to the increased swappiness offset when the system reboots.

The CVM monitor 176 may also monitor CPU utilization 193 and/or CVM utilization, and may conduct a comparison between the CPU utilization 193 and a CPU utilization threshold 191. The CVM utilization, for example, may be considered the system resources used by the CVM 162 and/or the ratio of CVM size 180 to the amount of CVM 162 space used. The CPU utilization threshold 191 may be defined based on the usage model of the system 142 and/or the OS 148. The CVM arbitrator 174 may determine that the CPU utilization 193 is equal to the CPU utilization threshold 191 (e.g., approximately 100% CPU utilization) based on the comparison between the CPU utilization 193 and the CPU utilization threshold 191, and determine that the CVM utilization is increasing or decreasing based on a comparison between CVM utilization at a current time (e.g., $t_n$) and CVM utilization at a previous time (e.g., $t_{n-1}$).

If the CVM arbitrator 174 determines that the CPU utilization 193 is equal to the CPU utilization threshold 191 based on the comparison between the CPU utilization 193 and the CPU utilization threshold 191, and determines that the CVM utilization is decreasing or not changing based on the comparison between CVM utilization at a current time (e.g., $t_n$) and CVM utilization at a previous time (e.g., $t_{n-1}$), the CVM arbitrator 174 may consider CVM 162 (e.g., resource utilization by CVM) to not be a bottleneck to system performance (e.g., accessing memory pages, processes and/or process data).

When the CVM arbitrator 174 determines that the CPU utilization 193 is equal to the CPU utilization threshold 191 and determines that the CVM utilization is increasing based on the comparison between CVM utilization at a current time (e.g., $t_n$) and CVM utilization at a previous time (e.g., $t_{n-1}$), the CVM arbitrator 174 may consider CVM 162 (e.g., resource utilization by ZRAM) to be a main part of system overhead (e.g., the swap process may be taking too many cycles of CPU).

The CVM arbitrator 174 may include a CVM stopper 198 that stops/deactivates CVM 162 and/or reduce kernel swap daemon (kswapd) cycles (e.g., kswapd may be responsible for CVM activities), when the CPU utilization 193 is equal to the CPU utilization threshold 191 and the CVM arbitrator 174 considers CVM 162 to be a main part of system overhead. The CVM stopper 198 may stop/deactivate CVM 162 while preserving data in CVM 162 (e.g., by setting the swappiness 184 to zero), so that CVM 162 may no longer be used by the system 142 and resource consumption by CVM 162 may be limited and/or eliminated. The CVM stopper 198 may be distinguished from a swapoff CVM setting that wipes data (e.g., frees/erases pages) from CVM 162.

The CVM arbitrator 174 may determine that the CPU utilization 193 is less than the CPU utilization threshold 191 (e.g., approximately 80% CPU utilization) based on the comparison between the CPU utilization 193 and the CPU utilization threshold 191. The CVM arbitrator 174 may determine whether the CVM 162 is stopped, when CVM arbitrator 174 determines that the CPU utilization 191 is less than the CPU utilization threshold 193. The CVM arbitrator 174 may include a CVM restarter 189 to restart CVM 162, when the CPU utilization 191 is less than the CPU utilization threshold 191 and the CVM arbitrator 174 determines that the CVM 162 is stopped. The CVM restarter 189 may set one or more CVM settings (e.g., CVM size 180 and/or swappiness 184) to previous value(s) set before CVM 162 being previously stopped by the stop CVM stopper 198. The system 142 may include a graphical display 199, as well as other components and/or subsystems (not shown), and use the CVM 162 to improve memory management for interactivity and/or performance of the graphical display 199 and/or other components and/or subsystems.

Figure 2:
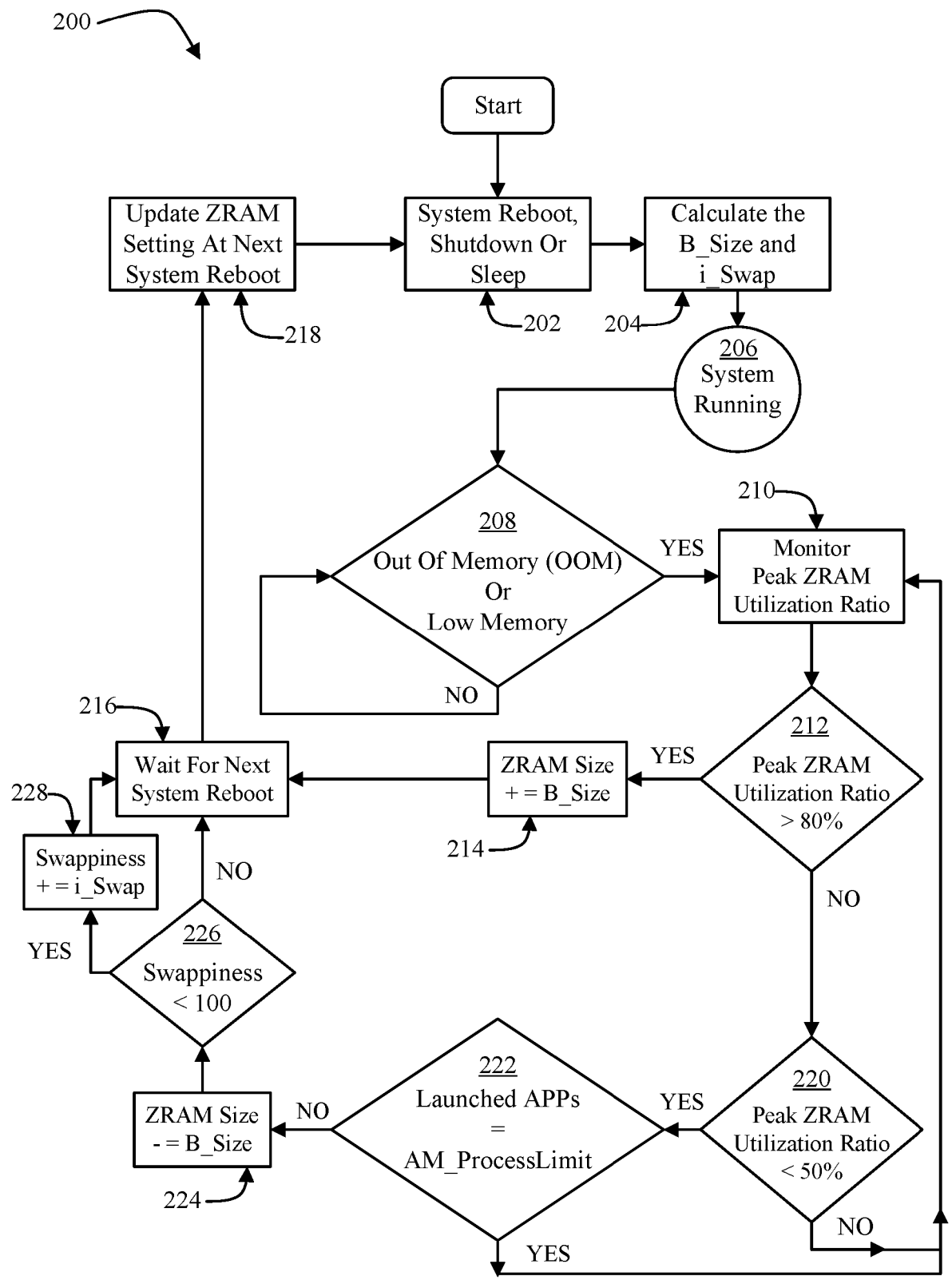
FIG. 2 is a flowchart of an example of a method of managing a compressed virtual memory (CVM) according to an embodiment.

Turning now to FIG. 2, flowchart 200 illustrates an example of a method of managing a compressed virtual memory (e.g., ZRAM). The method 200 may generally be implemented in a system such as, for example, the system 100 (FIG. 1A) and system 142 (FIG. 1B), already discussed. More particularly, the method 200 may be implemented as a set of logic instructions and/or firmware stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 200 may be written in any combination of one or more programming languages, including an object oriented programming language such as Java, Smalltalk, C++, ACPI (Advanced Configuration and Power Interface) source language (ASL) or the like and conventional procedural programming languages, such as the "C" programming language or similar programming languages.

Illustrated processing block 202 provides for transitioning the system to a system reboot mode, shutdown mode or sleep mode. During shutdown, mode and/or sleep mode system operating parameters may be saved for use by the system (e.g., the operating system executed by the processor of the system) upon system reboot. Illustrated processing block 204 calculates the size of ZRAM, a ZRAM size offset (e.g., offset), swappiness and a swappiness offset for the memory and/or ZRAM. The ZRAM size offset may be used to tune the size of the ZRAM. Swappiness may be tuned, for example, to a value between 0 and 100. A low value for swappiness may cause the operating system to prioritize interactivity over system performance, avoid swapping applications out of memory and/or ZRAM and, as a result, decrease response latency. A high value for swappiness may cause the operating system to prioritize system performance over interactivity and aggressively swap applications out of memory and/or ZRAM. CVM settings may depend on the usage model for the device (e.g., heavy application user, a heavy gaming, media centric user, a web-surfing user) to ensure that the system provides the best device hardware and software performance to the user.

Illustrated processing block 206 transitions the system to an operation mode during which the system processor executes one or more applications, loading the one or more applications into memory and/or ZRAM. Illustrated processing block 208 monitors a low memory killer and determine when/whether the low memory killer is executed. If an out of memory (OOM) or low memory condition is detected at block 208, illustrated processing block 210 monitors a peak utilization ratio.

Illustrated processing block 212 conducts a comparison between the peak utilization ratio and a peak utilization threshold and determines whether the peak utilization ratio exceeds the peak utilization threshold (e.g., approximately 80% of the ZRAM size) based on the comparison between the peak utilization ratio and the peak utilization threshold. If so, illustrated processing block 214 increases the ZRAM size offset to an increased ZRAM size offset, when the peak utilization ratio exceeds the peak utilization threshold. Illustrated processing block 216 provides for the system to continue to operate with current ZRAM settings (e.g., waiting for the system to reboot), and illustrated processing block 218 provides for the ZRAM settings to be updated/enabled, including setting the ZRAM size to the increased ZRAM offset when the system reboots.

If it is determined at block 212 that the peak utilization threshold is not exceeded, illustrated processing block 220 determines whether the peak utilization ratio is less than the peak utilization threshold (e.g., approximately 50% of the ZRAM size) based on the comparison between the peak utilization ratio and the peak utilization threshold. If so, illustrated processing block 222 conducts a comparison between a number of applications running (e.g., launched) (e.g., in the memory and/or the ZRAM) and a process threshold (e.g., am_process limit) and determines whether the number of applications running is less than the process threshold based on the comparison between the number of applications running and the process threshold. If the number of running applications is less than the process threshold, illustrated processing block 224 decreases the ZRAM size offset to a decreased ZRAM size offset, when the number of applications running is less than the process threshold (e.g., am_process limit). The process threshold may be set by an OS such as, for example, the OS 104 (FIG. 1A) and OS 148 (FIG. 1B) based on the size of the memory and/or the configuration of the system and ensure that the number of applications running does not exceed the process threshold.

Illustrated processing block 226 conducts a comparison between the swappiness and a swappiness threshold (e.g., 100). Block 226 may also determine whether the swappiness is less than the swappiness threshold based on the comparison between the swappiness and the swappiness threshold. If so, illustrated processing block 228 increases the swappiness offset for the swappiness to an increased swappiness offset. As already noted, illustrated processing block 216 continues to operate the system with the current ZRAM settings (e.g., waiting for the system to reboot), and illustrated processing block 218 updates/enables the ZRAM settings, including setting the ZRAM size to the increased ZRAM offset and setting the swappiness to the increased swappiness offset when the system reboots.

Figure 3:
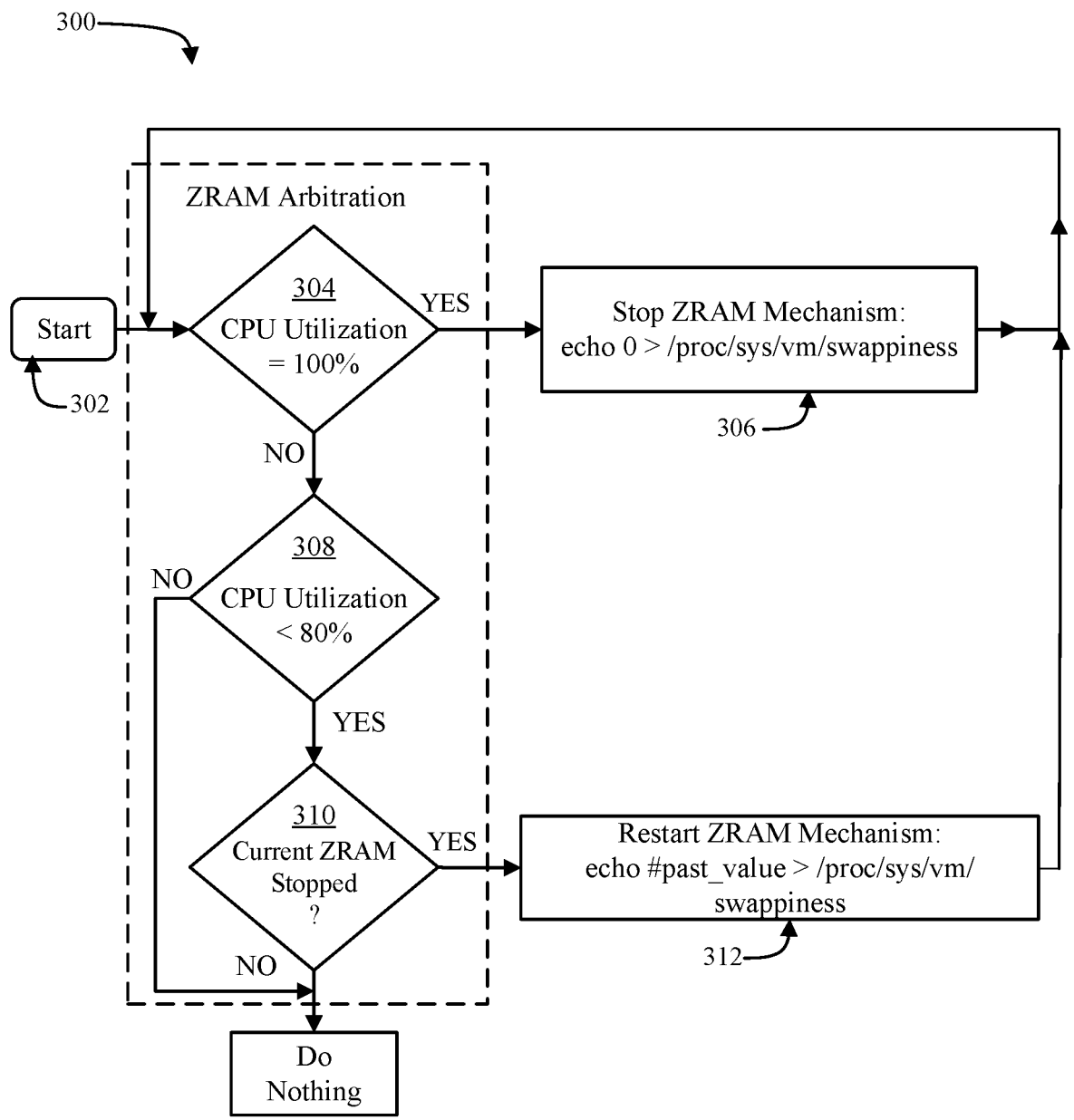
FIG. 3 is a flowchart of example of a method of conducting CVM arbitrations according to an embodiment.

Turning now to FIG. 3, flowchart 300 illustrates an example of a method of CVM (e.g., ZRAM) arbitration. The method 300 may generally be implemented in a system such as, for example, the system 100 (FIG. 1A) and system 142 (FIG. 1B), already discussed. More particularly, the method 300 may be implemented as a set of logic instructions and/or firmware stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 302 provides for the system to transition to a system reboot mode, shutdown mode or sleep mode. During shutdown mode and/or sleep mode, system operating parameters may be saved for use by the system (e.g., the OS executed by the processor of the system) upon system reboot. Illustrated processing block 304 monitors CPU utilization and/or ZRAM utilization, and conduct a comparison between the CPU utilization and a CPU utilization threshold. The CPU utilization threshold may be defined based on the usage model of the system and/or the OS. ZRAM arbitration (e.g., a ZRAM arbitrator) may determine that the CPU utilization is equal to the CPU utilization threshold (e.g., approximately 100% CPU utilization) based on the comparison between the CPU utilization and the CPU utilization threshold, and determine that the ZRAM utilization is increasing or decreasing based on a comparison between ZRAM utilization at a current time (e.g., $t_n$) and ZRAM utilization at a previous time (e.g., $t_{n-1}$).

When ZRAM arbitration determines that the CPU utilization is equal to the CPU utilization threshold based on the comparison between the CPU utilization and the CPU utilization threshold, and determines that the ZRAM utilization is decreasing or not changing based on the comparison between ZRAM utilization at a current time (e.g., $t_n$) and ZRAM utilization at a previous time (e.g., $t_{n-1}$), ZRAM arbitration may consider ZRAM (e.g., resource utilization by ZRAM) to not be a bottleneck to system performance (e.g., accessing memory pages, processes and/or process data).

When ZRAM arbitration determines that the CPU utilization is equal to the CPU utilization threshold and determines that the ZRAM utilization is increasing based on the comparison between ZRAM utilization at a current time (e.g., $t_n$) and ZRAM utilization at a previous time (e.g., $t_{n-1}$), ZRAM arbitration may consider ZRAM (e.g., resource utilization by ZRAM) to be a main part of system overhead (e.g., the swap process may be taking too many cycles of CPU).

Illustrated processing block 306 stops/deactivates ZRAM and/or reduces kernel swap daemon (kswapd) cycles (e.g., kswapd may be responsible for ZRAM activities), when the CPU utilization is equal to the CPU utilization threshold and ZRAM arbitration considers ZRAM to be a main part of system overhead. Kswapd may swap modified pages out to swap space (e.g., on a secondary memory storage such as flash memory, hard drive) to keep memory management operating efficiently. For example, when CPU utilization is high, GRAM compression/decompression may take significant CPU cycles, which may make system performance worse and even lead total system hang for some period of time. The stop ZRAM mechanism (e.g., a ZRAM stopper) stops/deactivates ZRAM while preserving data in ZRAM (e.g., by setting the swappiness of ZRAM to zero), so that ZRAM may no longer be used by the system and resource consumption by ZRAM may be limited and/or eliminated. The stop GRAM mechanism may be distinguished from a swapoff ZRAM setting that wipes data (e.g., frees/erases pages) from ZRAM.

Illustrated processing block 308 determines that the CPU utilization is less than the CPU utilization threshold (e.g., approximately 80% CPU utilization) based on the comparison between the CPU utilization and the CPU utilization threshold. Illustrated processing block 310 determines that ZRAM is stopped, when ZRAM arbitration determines that the CPU utilization is less than the CPU utilization threshold. Illustrated processing block 312 provides for a restart ZRAM mechanism (e.g., a ZRAM restarter) to restart ZRAM when the CPU utilization is less than the CPU utilization threshold and ZRAM arbitration determines that ZRAM is stopped. The restart ZRAM mechanism sets one or more ZRAM settings (e.g., ZRAM size and/or swappiness) to previous value(s) before ZRAM being previously stopped by the stop ZRAM mechanism.

FIG. 4 illustrates an example chart 400 of data documenting the impact of CVM ZRAM) on the launch time of applications when CPU pressure is high (e.g., CPU utilization equal to or greater than the CPU utilization threshold). The chart 400 illustrates that when CPU pressure is high, ZRAM enabled may impact system performance by approximately 20%-40%.

FIG. 5 illustrates an example chart 500 of data documenting the impact of CVM (e.g., ZRAM) on processes running in memory. The chart 500 illustrates that, for example, the kswapd process (e.g., may be responsible for ZRAM activity) may consume approximately 35% of CPU cycles when ZRAM is enabled, but when ZRAM is disabled, the extra CPU cycles may be distributed in order to launch applications faster and improve system performance. For example, the extra CPU cycles may be distributed by Android services app_process32 and surfaceflinger, where app_process32 may be responsible for starting applications and surfaceflinger may be responsible for compositing applications and system surfaces into a single buffer that is to be displayed by the display controller of the system.

Figure 6:
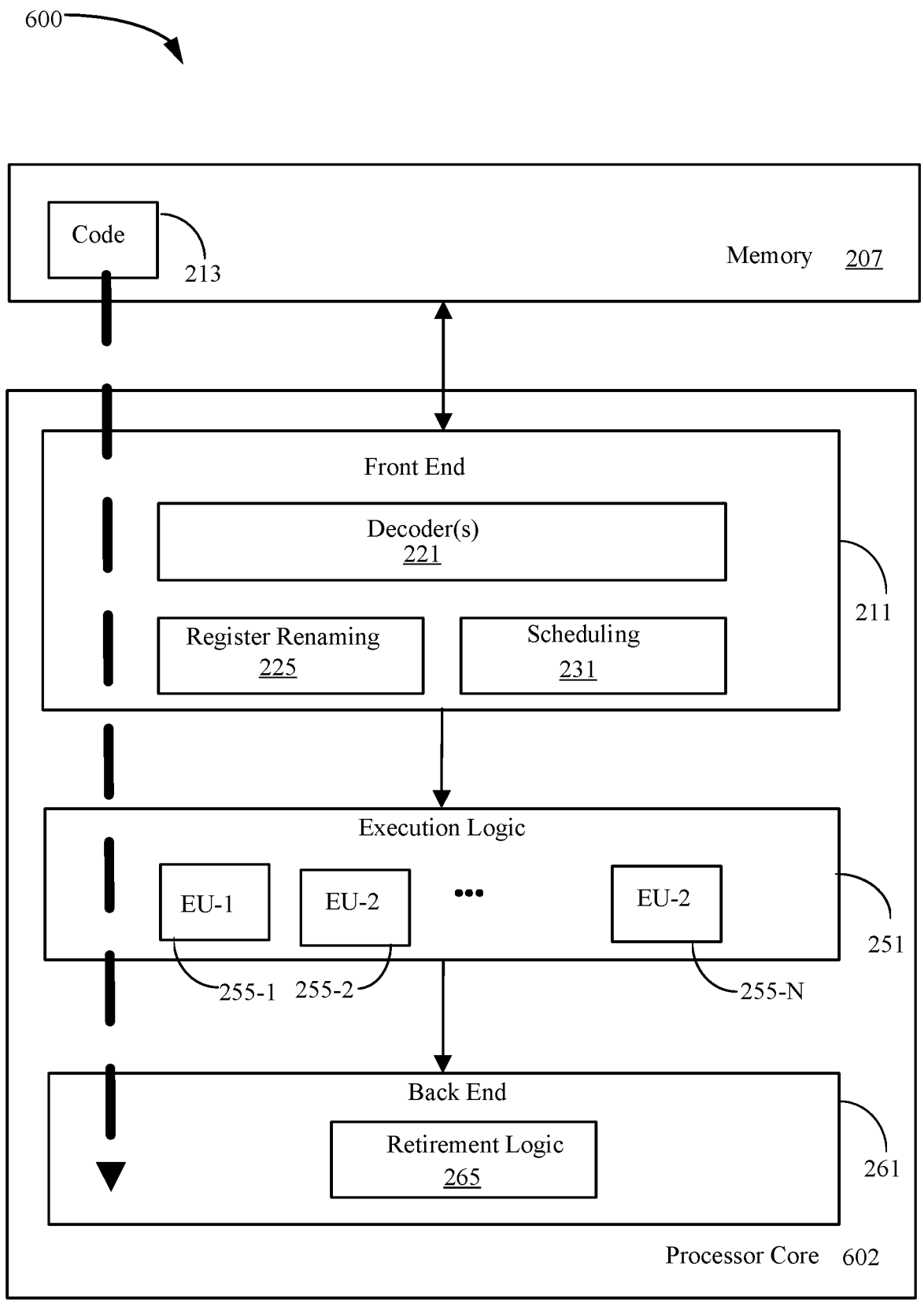
FIG. 6 is a block diagram of an example of a processor according to an embodiment.

FIG. 6 illustrates a processor core 602 according to one embodiment. The processor core 602 may be the core for any type of processor, such as a micro-processor, an embedded processor, a digital signal processor (DSP), a network processor, or other device to execute code. Although only one processor core 602 is illustrated in FIG. 6, a processing element may alternatively include more than one of the processor core 602 illustrated in FIG. 6. The processor core 602 may be a single-threaded core or, for at least one embodiment, the processor core 602 may be multithreaded in that it may include more than one hardware thread context (or "logical processor") per core.

FIG. 6 also illustrates a memory 207 coupled to the processor core 602. The memory 207 may be any of a wide variety of memories (including various layers of memory hierarchy) as are known or otherwise available to those of skill in the art. The memory 207 may include one or more code 213 instruction(s) to be executed by the processor core 602, wherein the code 213 may implement the method 200 (FIG. 2) and/or the method 300 (FIG. 3), already discussed. In one example, the memory 207 is non-flash memory. The processor core 602 follows a program sequence of instructions indicated by the code 213. Each instruction may enter a front end portion 211 and be processed by one or more decoders 221. The decoder 221 may generate as its output a micro operation such as a fixed width micro operation in a predefined format, or may generate other instructions, microinstructions, or control signals which reflect the original code instruction. The illustrated front end 211 also includes register renaming logic 225 and scheduling logic 231, which generally allocate resources and queue the operation corresponding to the convert instruction for execution.

The processor core 602 is shown including execution logic 251 having a set of execution units 255-1 through 255-N. Some embodiments may include a number of execution units dedicated to specific functions or sets of functions. Other embodiments may include only one execution unit or one execution unit that can perform a particular function. The illustrated execution logic 251 performs the operations specified by code instructions.

After completion of execution of the operations specified by the code instructions, back end logic 261 retires the instructions of the code 213. In one embodiment, the processor core 602 allows out of order execution but requires in order retirement of instructions. Retirement logic 265 may take a variety of forms as known to those of skill in the art (e.g., re-order buffers or the like). In this manner, the processor core 602 is transformed during execution of the code 213, at least in terms of the output generated by the decoder, the hardware registers and tables utilized by the register renaming logic 225, and any registers (not shown) modified by the execution logic 251.

Although not illustrated in FIG. 6, a processing element may include other elements on chip with the processor core 602. For example, a processing element may include memory control logic along with the processor core 602. The processing element may include I/O control logic and/or may include I/O control logic integrated with memory control logic. The processing element may also include one or more caches.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 200 (FIG. 2) and/or the method 300 (FIG. 3), already discussed, and may be similar to the code 213 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

Additional Notes and Examples

Example 1 may include a memory-based computing system comprising a graphical display, a dynamic configuration apparatus communicatively coupled to the graphical display, the dynamic configuration apparatus including, a compressed virtual memory (CVM) having a CVM size, a CVM monitor to monitor a low memory killer and a peak utilization ratio, determine that the low memory killer is executed, and conduct a comparison between the peak utilization ratio and a peak utilization threshold, and a CVM tuner to tune the CVM size based on the comparison between the peak utilization ratio and the peak utilization threshold.

Example 2 may include the system of Example 1, wherein the CVM tuner is to determine that the peak utilization ratio exceeds the peak utilization threshold based on the comparison between the peak utilization ratio and the peak utilization threshold, wherein the memory further includes a CVM size calculator to calculate the CVM size and an offset, and a CVM settings updater to increase the offset to an increased offset, and wherein the CVM size is set to the increased offset when the system reboots, wherein the low memory killer is to be executed when an amount of the memory available is low.

Example 3 may include the system of any one of Examples 1 or 2, wherein the peak utilization threshold is to be equal to approximately 80% of the CVM size.

Example 4 may include the system of Example 1, wherein the CVM tuner is to determine that the peak utilization ratio is less than the peak utilization threshold based on the comparison between the peak utilization ratio and the peak utilization threshold, conduct a comparison between a number of applications running in the CVM and a process threshold and determine that the number of applications running is less than the process threshold based on the comparison between the number of applications running and the process threshold, and wherein the memory further includes a CVM size calculator to calculate the CVM size and an offset, and a CVM settings updater to decrease the offset to a decreased offset.

Example 5 may include the system of Example 4, wherein the CVM tuner is to calculate a swappiness and a swappiness offset for the CVM, conduct a comparison between the swappiness and a swappiness threshold and determine that the swappiness is less than the swappiness threshold based on the comparison between the swappiness and the swappiness threshold, and wherein the CVM settings updater is to increase a swappiness offset for the swappiness to an increased swappiness offset.

Example 6 may include the system of Example 5, wherein, when the system reboots, the swappiness is to be increased to the increased swappiness offset and the CVM size is to be decreased to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein the low memory killer is to be executed when an amount of the memory available is low.

Example 7 may include the system of any one of Examples 1 or 4, wherein the peak utilization threshold is to be equal to approximately 50% of the CVM size.

Example 8 may include a dynamic configuration apparatus comprising a compressed virtual memory (CVM) monitor to monitor a low memory killer and a peak utilization ratio for a CVM size of a CVM, determine that the low memory killer is executed, and conduct a comparison between the peak utilization ratio and a peak utilization threshold, and a CVM tuner to tune the CVM size based on the comparison between the peak utilization ratio and the peak utilization threshold.

Example 9 may include the apparatus of Example 8, further comprising a CVM size calculator to calculate a CVM size and an offset for a CVM, wherein the CVM tuner is further to determine that the peak utilization ratio exceeds the peak utilization threshold based on the comparison between the peak utilization ratio and the peak utilization threshold, wherein the apparatus further includes a CVM settings updater to increase the offset to an increased offset, and wherein the CVM size is to be set to the increased offset when the apparatus is restarted, wherein a memory of the apparatus includes the CVM, wherein the low memory killer is to be executed when an amount of the memory available is low.

Example 10 may include the apparatus of any one of Examples 8 or 9, wherein the peak utilization threshold is to be equal to approximately 80% of the CVM size.

Example 11 may include the apparatus of Example 8, further comprising a CVM size calculator to calculate a CVM size and an offset for a CVM, wherein the CVM tuner is to further determine that the peak utilization ratio is less than the peak utilization threshold based on the comparison between the peak utilization ratio and the peak utilization threshold, conduct a comparison between a number of applications running in the CVM and a process threshold and determine that the number of applications running is less than the process threshold based on the comparison between the number of applications running and the process threshold, wherein the apparatus further includes a CVM settings updater to decrease the offset to a decreased offset.

Example 12 may include the apparatus of Example 11, wherein the CVM tuner is further to calculate a swappiness and a swappiness offset for the CVM, conduct a comparison between the swappiness and a swappiness threshold and determine that the swappiness is less than the swappiness threshold based on the comparison between the swappiness and the swappiness threshold, and wherein the CVM settings updater is further to increase a swappiness offset for the swappiness to an increased swappiness offset.

Example 13 may include the apparatus of Example 12, wherein, when the apparatus is restarted, the swappiness is to be increased to the increased swappiness offset and the CVM size is to be decreased to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein a memory of the apparatus includes the CVM, wherein the low memory killer is to be executed when an amount of the memory available is low.

Example 14 may include the apparatus of any one of Examples 8 or 11, wherein the peak utilization threshold is to be equal to approximately 50% of the CVM size.

Example 15 may include at least one computer readable storage medium comprising a set of instructions, which when executed by a computing system, cause the computing system to determine that a low memory killer is triggered for a memory of the apparatus, conduct a comparison between a peak utilization ratio for a compressed virtual memory (CVM) size of a CVM and a peak utilization threshold based on determining that the low memory killer is triggered, and tune the CVM size based on the comparison between the peak utilization ratio and the peak utilization threshold.

Example 16 may include the at least one computer readable storage medium of Example 15, wherein the set of instructions, when executed by the computing system, cause the computing system to determine that the peak utilization ratio exceeds the peak utilization threshold based on the comparison between the peak utilization ratio and the peak utilization threshold, calculate the CVM size and an offset, increase the offset to an increased offset; and set the CVM size to the increased offset when the computing system reboots, wherein the memory includes the CVM, wherein the low memory killer is to be triggered when an amount of the memory available is low.

Example 17 may include the at least one computer readable storage medium of any one of Examples 15 or 16, wherein the peak utilization threshold is to be equal to approximately 80% of the CVM size.

Example 18 may include the at least one computer readable storage medium of Examples 15, wherein the set of instructions, when executed by the computing system, cause the computing system to determine that the peak utilization ratio is less than the peak utilization threshold based on the comparison between the peak utilization ratio and the peak utilization threshold, conduct a comparison between a number of applications running in the CVM and a process threshold, determine that the number of applications running is less than the process threshold based on the comparison between the number of applications running and the process threshold, calculate the CVM size and an offset, and decrease the offset to a decreased offset, wherein the memory includes the CVM.

Example 19 may include the at least one computer readable storage medium of Example 18, wherein the set of instructions, when executed by the computing system, cause the computing system to calculate a swappiness and a swappiness offset for the CVM, conduct a comparison between the swappiness and a to swappiness threshold, determine that the swappiness is less than the swappiness threshold based on the comparison between the swappiness and the swappiness threshold, and increase a swappiness offset for the swappiness to an increased swappiness offset.

Example 20 may include the at least one computer readable storage medium of Example 19, wherein, when the computing system is restarted, the set of instructions, when executed by the computing system, cause the computing system to set the swappiness to the increased swappiness offset and set the CVM size to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein the low memory killer is to be triggered when an amount of the memory available is low.

Example 21 may include the at least one computer readable storage medium of any one of Examples 15 or 18, wherein the peak utilization threshold is to be equal to approximately 50% of the CVM size.

Example 22 may include a method comprising determining that a low memory killer is triggered for a memory of a computer system, conducting a comparison between a peak utilization ratio for a compressed virtual memory (CVM) size of a CVM to a peak utilization threshold based on the determining that the low memory killer is triggered, and tuning the CVM size based on the comparison between the peak utilization ratio and the peak utilization threshold.

Example 23 may include the method of Example 22, wherein tuning the CVM size further comprises determining that the peak utilization ratio exceeds the peak utilization threshold based on the comparison between the peak utilization ratio and the peak utilization threshold, calculating the CVM size and an offset, increasing the offset to an increased offset, and setting the CVM size to the increased offset when the computer system reboots, wherein the memory includes the CVM, wherein the low memory killer is triggered when an amount of the memory available is low.

Example 24 may include the method of Example 22, wherein tuning the CVM size further comprises determining that the peak utilization ratio is less than the peak utilization threshold based on the comparison between the peak utilization ratio and the peak utilization threshold, conducting a comparison between a number of applications running in the CVM and a process threshold, determining that the number of applications running is less than the process threshold based on the comparison between the number of applications running and the process threshold, calculating the CVM size and an offset, and decreasing the offset to a decreased offset.

Example 25 may include the method of Example 24, further comprising calculating a swappiness and a swappiness offset for the CVM, conducting a comparison between the swappiness and a swappiness threshold, determining that the swappiness is less than the swappiness threshold based on the comparison between the swappiness and the swappiness threshold, increasing a swappiness offset for the swappiness to an increased swappiness offset, and, when the system reboots, setting the swappiness to the increased swappiness offset, and setting the CVM size to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein the memory includes the CVM, wherein the low memory killer is triggered when an amount of the memory available is low.

Example 26 may include a memory-based computing apparatus comprising means for determining that a low memory killer is triggered for a memory of the apparatus, means for conducting a comparison between a peak utilization ratio for a compressed virtual memory (CVM) size of a CVM to a peak utilization threshold based on the determining that the low memory killer is triggered, and means for tuning the CVM size based on the comparison between the peak utilization ratio and the peak utilization threshold.

Example 27 may include the apparatus of Example 26, further including means for determining that the peak utilization ratio exceeds the peak utilization threshold based on the comparison between the peak utilization ratio and the peak utilization threshold, means for calculating the CVM size and an offset, means for increasing the offset to an increased offset, and means for setting the CVM size to the increased offset when the computer system reboots, wherein the memory is to include the CVM, wherein the low memory killer is to be triggered when an amount of the memory available is low.

Example 28 may include the apparatus of Example 26, further including means for determining that the peak utilization ratio is less than the peak utilization threshold based on the comparison between the peak utilization ratio and the peak utilization threshold, means for conducting a comparison between a number of applications to be running in the CVM and a process threshold, means for determining that the number of applications to be running is less than the process threshold based on the comparison between the number of applications to be running and the process threshold, means for calculating the CVM size and an offset, and means for decreasing the offset to a decreased offset.

Example 29 may include the apparatus of Example 28, further comprising means for calculating a swappiness and a swappiness offset for the CVM, means for conducting a comparison between the swappiness and a swappiness threshold, means for determining that the swappiness is less than the swappiness threshold based on the comparison between the swappiness and the swappiness threshold, means for increasing a swappiness offset for the swappiness to an increased swappiness offset, and, when the system reboots, means for setting the swappiness to the increased swappiness offset, and means for setting the CVM size to the decreased offset.

Example 30 may include the apparatus of Example 29, wherein a low value for the swappiness is to indicate to prioritize interactivity over system performance and avoid swapping applications out of the CVM and a high value for the swappiness is to indicate to prioritize system performance over interactivity and aggressively swap applications out of the CVM, wherein the memory is to include the CVM, wherein the low memory killer is to be triggered when an amount of the memory available is low.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a graphical display; and
a dynamic configuration apparatus communicatively coupled to the graphical display, the dynamic configuration apparatus including,
a compressed virtual memory (CVM) having a CVM size,
a CVM monitor to monitor a low memory killer and a peak utilization ratio, determine that the low memory killer is executed, and conduct a comparison between the peak utilization ratio and a peak utilization threshold, and
a CVM tuner to tune the CVM size based on the comparison between the peak utilization ratio and the peak utilization threshold.

2. The system of claim 1, wherein the CVM tuner is to determine that the peak utilization ratio exceeds the peak utilization threshold based on the comparison between the peak utilization ratio and the peak utilization threshold, wherein the memory further includes a CVM size calculator to calculate the CVM size and an offset, and a CVM settings updater to increase the offset to an increased offset, and wherein the CVM size is to be set to the increased offset when the system reboots, wherein the low memory killer is to be executed when an amount of the memory available is low.

3. The system of claim 2, wherein the peak utilization threshold is to be equal to approximately 80% of the CVM size.

4. The system of claim 1, wherein the CVM tuner is to determine that the peak utilization ratio is less than the peak utilization threshold based on the comparison between the peak utilization ratio and the peak utilization threshold, conduct a comparison between a number of applications running in the CVM and a process threshold and determines that the number of applications running is less than the process threshold based on the comparison between the number of applications running and the process threshold, and wherein the memory further includes a CVM size calculator to calculate the CVM size and an offset, and a CVM settings updater to decrease the offset to a decreased offset.

5. The system of claim 4, wherein the CVM tuner is to calculate a swappiness and a swappiness offset for the CVM, conduct a comparison between the swappiness and a swappiness threshold and determine that the swappiness is less than the swappiness threshold based on the comparison between the swappiness and the swappiness threshold, and wherein the CVM settings updater is to increase a swappiness offset for the swappiness to an increased swappiness offset.

6. The system of claim 5, wherein, when the system reboots, the swappiness is to be increased to the increased swappiness offset and the CVM size is to be decreased to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein the low memory killer is to be executed when an amount of the memory available is low.

7. The system of claim 4, wherein the peak utilization threshold is to be equal to approximately 50% of the CVM size.

8. An apparatus comprising:
a compressed virtual memory (CVM) monitor to monitor a low memory killer and a peak utilization ratio for a CVM size of a CVM, determine that the low memory killer is executed, and conduct a comparison between the peak utilization ratio and a peak utilization threshold; and
a CVM tuner to tune the CVM size based on the comparison between the peak utilization ratio and the peak utilization threshold.

9. The apparatus of claim 8, further comprising a CVM size calculator to calculate a CVM size and an offset for a CVM,
wherein the CVM tuner is further to determine that the peak utilization ratio exceeds the peak utilization threshold based on the comparison between the peak utilization ratio and the peak utilization threshold, wherein the apparatus further includes a CVM settings updater to increase the offset to an increased offset, and wherein the CVM size is to be set to the increased offset when the apparatus is restarted, wherein a memory of the apparatus includes the CVM, wherein the low memory killer is to be executed when an amount of the memory available is low.

10. The apparatus of claim 9, wherein the peak utilization threshold is to be equal to approximately 80% of the CVM size.

11. The apparatus of claim 8, further comprising a CVM size calculator to calculate a CVM size and an offset for a CVM, wherein the CVM tuner is to further determine that the peak utilization ratio is less than the peak utilization threshold based on the comparison between the peak utilization ratio and the peak utilization threshold, conduct a comparison between a number of applications running in the CVM and a process threshold and determine that the number of applications running is less than the process threshold based on the comparison between the number of applications running and the process threshold, wherein the apparatus further includes a CVM settings updater to decrease the offset to a decreased offset.

12. The apparatus of claim 11, wherein the CVM tuner is further to calculate a swappiness and a swappiness offset for the CVM, conduct a comparison between the swappiness and a swappiness threshold and determine that the swappiness is less than the swappiness threshold based on the comparison between the swappiness and the swappiness threshold, and wherein the CVM settings updater is further to increase a swappiness offset for the swappiness to an increased swappiness offset.

13. The apparatus of claim 12, wherein, when the apparatus is restarted, the swappiness is to be increased to the increased swappiness offset and the CVM size is to be decreased to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein a memory of the apparatus includes the CVM, wherein the low memory killer is to be executed when an amount of the memory available is low.

14. The apparatus of claim 11, wherein the peak utilization threshold is to be equal to approximately 50% of the CVM size.

15. At least one computer readable storage medium comprising a set of instructions, which when executed by an apparatus, cause the apparatus to:

determine that a low memory killer is triggered for a memory of the apparatus;
conduct a comparison between a peak utilization ratio for a compressed virtual memory (CVM) size of a CVM and a peak utilization threshold based on determining that the low memory killer is triggered; and
tune the CVM size based on the comparison between the peak utilization ratio and the peak utilization threshold.

16. The at least one computer readable storage medium of claim 15, wherein the set of instructions, when executed by the apparatus, cause the apparatus to:
determine that the peak utilization ratio exceeds the peak utilization threshold based on the comparison between the peak utilization ratio and the peak utilization threshold;
calculate the CVM size and an offset;
increase the offset to an increased offset; and
set the CVM size to the increased offset when the apparatus reboots, wherein the memory includes the CVM, wherein the low memory killer is to be triggered when an amount of the memory available is low.

17. The at least one computer readable storage medium of claim 16, wherein the peak utilization threshold is to be equal to approximately 80% of the CVM size.

18. The at least one computer readable storage medium of claim 15, wherein the set of instructions, when executed by the apparatus, cause the apparatus to:
determine that the peak utilization ratio is less than the peak utilization threshold based on the comparison between the peak utilization ratio and the peak utilization threshold;
conduct a comparison between a number of applications running in the CVM and a process threshold;
determine that the number of applications running is less than the process threshold based on the comparison between the number of applications running and the process threshold;
calculate the CVM size and an offset; and
decrease the offset to a decreased offset, wherein the memory includes the CVM.

19. The at least one computer readable storage medium of claim 18, wherein the set of instructions, when executed by the apparatus, cause the apparatus to:
calculate a swappiness and a swappiness offset for the CVM;
conduct a comparison between the swappiness and a swappiness threshold;
determine that the swappiness is less than the swappiness threshold based on the comparison between the swappiness and the swappiness threshold; and
increase a swappiness offset for the swappiness to an increased swappiness offset.

20. The at least one computer readable storage medium of claim 19, wherein, when the apparatus is restarted, the set of instructions, when executed by the apparatus, cause the apparatus to set the swappiness to the increased swappiness offset and set the CVM size to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein the low memory killer is to be triggered when an amount of the memory available is low.

21. The at least one computer readable storage medium of claim 18, wherein the peak utilization threshold is to be equal to approximately 50% of the CVM size.

22. A method comprising:
- determining that a low memory killer is triggered for a memory of a computer system;
- conducting a comparison between a peak utilization ratio for a compressed virtual memory (CVM) size of a CVM to a peak utilization threshold based on the determining that the low memory killer is triggered; and
- tuning the CVM size based on the comparison between the peak utilization ratio and the peak utilization threshold.

23. The method of claim 22, wherein tuning the CVM size further comprises:
- determining that the peak utilization ratio exceeds the peak utilization threshold based on the comparison between the peak utilization ratio and the peak utilization threshold;
- calculating the CVM size and an offset;
- increasing the offset to an increased offset; and
- setting the CVM size to the increased offset when the computer system reboots, wherein the memory includes the CVM, wherein the low memory killer is triggered when an amount of the memory available is low.

24. The method of claim 22, wherein tuning the CVM size further comprises:
- determining that the peak utilization ratio is less than the peak utilization threshold based on the comparison between the peak utilization ratio and the peak utilization threshold;
- conducting a comparison between a number of applications running in the CVM and a process threshold;
- determining that the number of applications running is less than the process threshold based on the comparison between the number of applications running and the process threshold;
- calculating the CVM size and an offset; and
- decreasing the offset to a decreased offset.

25. The method of claim 24, further comprising:
- calculating a swappiness and a swappiness offset for the CVM;
- conducting a comparison between the swappiness and a swappiness threshold;
- determining that the swappiness is less than the swappiness threshold based on the comparison between the swappiness and the swappiness threshold;
- increasing a swappiness offset for the swappiness to an increased swappiness offset; and, when the system reboots,
- setting the swappiness to the increased swappiness offset; and
- setting the CVM size to the decreased offset, wherein a low value for the swappiness indicates to prioritize interactivity over system performance and avoid swapping applications out of the CVM and a high value for the swappiness indicates to prioritize system performance over interactivity and aggressively swap applications out of the CVM, wherein the memory includes the CVM, wherein the low memory killer is triggered when an amount of the memory available is low.

* * * * *